April 13, 1954　　　D. C. BRUNTON　　　2,675,482
METHOD AND APPARATUS FOR MEASURING MATERIAL THICKNESS
Filed March 25, 1952　　　2 Sheets-Sheet 1

Inventor
DONALD C. BRUNTON
by: Fetherstonhaugh & Co.
Attys.

Inventor
DONALD C. BRUNTON

Patented Apr. 13, 1954

2,675,482

UNITED STATES PATENT OFFICE 2,675,482

METHOD AND APPARATUS FOR MEASURING MATERIAL THICKNESS

Donald C. Brunton, Oakville, Ontario, Canada, assignor to Isotope Products Limited, Oakville, Ontario, Canada, a company of Ontario Application March 25, 1952, Serial No. 278,449

3 Claims. (Cl. 250—83.6)

This invention relates to a method and apparatus for measuring thickness of tank walls.

Heretofore, methods have been proposed for measuring the thickness of a material by detecting sonic or radiation energy coming therefrom, which energy may represent that reflected by the material from the source or the non-absorbed energy coming from a source disposed on the opposite side of the material from the detector. In prior apparatus and methods for measuring thickness of a material in accordance with this general system, the position of the source and detector relative to the surface of the material is so critical that it is, in many cases, necessary to specially prepare the surface of the material for each reading. When the material is covered by protective coatings or packings, use of prior apparatus in most cases becomes impractical due to the preparatory labour involved in making each measurement. Accordingly, prior devices are employed for taking measurements at selected points on the material, but the number of such measurements required to obtain a desired statistical average is so great having regard to measuring operations required as to seriously limit the practical application of such prior methods on a commercial scale.

It is the particular object of the invention to provide a method and apparatus for obtaining a continuous indication of thickness at least along a line over the surface of a material and wherein the entire surface of the material may be scanned.

It is also an object of the invention to provide a scanning method and apparatus for measuring the thickness of material by radiation techniques or equivalent, wherein the radiation detector is maintained at a predetermined spaced distance from the surface of the material being examined and the source is also, in all cases, maintained in predetermined spaced position of relatively wide tolerance from the surface of the material.

It is also an object of the invention to provide method and apparatus as before which is adaptable for measurement of thickness by a reflection or transmission radiation technique.

Other objects of the invention will be appreciated by a study of the following specification taken in conjunction with the accompanying drawings.

Figure 1:
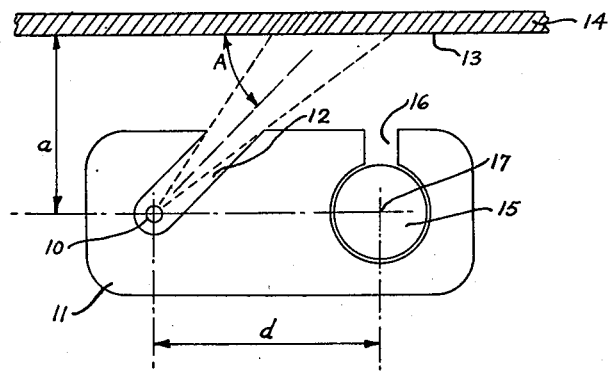
Figure 1 is a diagrammatic illustration of a detector head according to the invention, showing the relation between distance from the source to the surface of the wall to be examined and the distance between the source and the detecting device, and being a function of the mean angle of incidence of the collimation of the radiation with respect to the surface of the material being examined.

The specific design of the components hereinafter described, particularly as to the electronic circuitry in the amplifiers for the detectors and the like, may follow the practice described in co-pending application Serial Number 238,880 filed July 27, 1951, or the practice of the prior art well known to skilled persons. In particular, however, the present invention concerns the predetermined placement of the source of radiation from the surface of the material to be examined so that slight variations in this distance will not materially affect the readings of thickness obtained. Referring to Figure 1, the radiation energy source 10 may be cobalt 60 of fifty millicuries, 1200 kilovolts. Such a source is adaptable for measuring the thickness of materials up to two inches or so. For thinner materials, other sources ranging down to 100 kilovolts energy and lesser activity may be used. For example, in measuring the thickness of a relatively thin sheet which is disposed in slightly spaced apart relation in front of a relatively thick sheet, the low energy source is particularly indicated for a thickness measuring technique in this instance.

I have found that it is best to collimate the radiation energy from the source by placing the source 10 within a body 11 of lead or other suitable isolating material and forming a collimating passage 12 in such manner that the radiation energy proceeds to the surface 13 of the material 14 being examined at a mean angle of incidence of approximately forty-two degrees. The desired mean angle of incidence of such collimated rays of radiation will differ for different materials and sources, the suggested angle being desirable for boiler plate. The isolating body 11 serves to mount a radiation detecting device 15 of any well known form, such as a pressure ionization chamber of known construction, or a photomultiplier class of detector of the form disclosed in my said copending application. A suitable window 16 leads to the detector device through the isolating body 11. The distance $d$ between the source and the centre line 17 of the detector 15 is preferably the minimum necessary to provide sufficient isolation of the detector from the source 10. I have found that if the source is positioned the dimension $a$ from the surface 13 of a value greater than $d$ any slight irregularity maintenance of the dimension $a$ will seriously affect the thickness readings of the material 14. On the other hand, if the dimension $a$ is too small, a similar condition of inaccuracies arising from the difficulty of maintaining the distance between the source and the surface constant arises.

I have determined that a dimension $a$ of relatively wide tolerance may be used to avoid many of the difficulties experienced in the operation of devices of the prior art. It has been found that the following empirical expression holds for a gamma radiation source irradiating boiler plate in a reflection technique of measurement:

$$a = \tfrac{4}{5} d \tan A \text{ approximately}$$

where $a$ is the distance between the source and the surface of the material being examined, $d$ is the distance between the source and the detector, and $A$ is the mean angle of incidence of the collimated radiation from the source with respect to the surface of the material being examined.

The factor $\tfrac{4}{5}$ is a sufficient guide to obtain the desired operability with angles of incidence of the magnitude of forty-two degrees.

Figure 2:
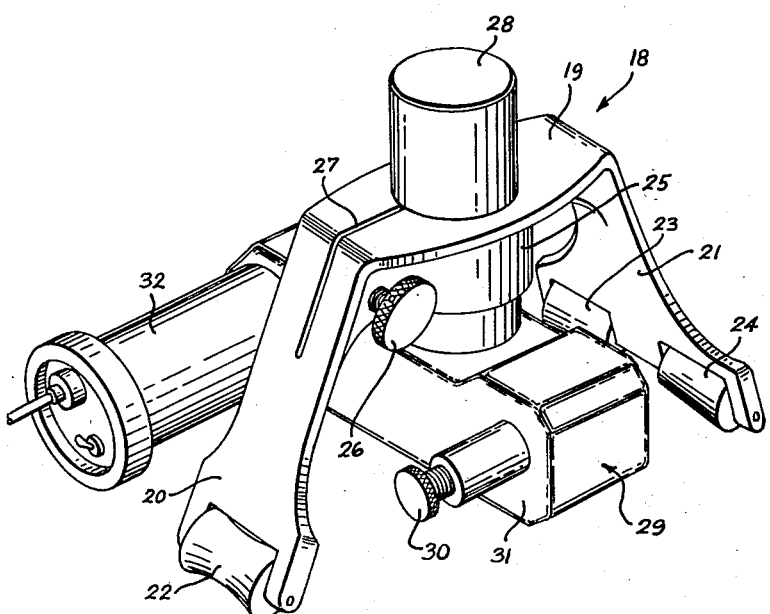
Figure 2 is a perspective view of detector head apparatus according to the invention, illustrating the detector carriage and the mounting of the components thereon.
Figure 3:
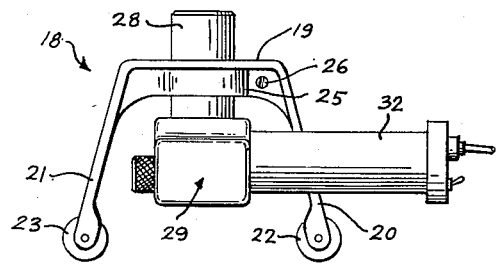
Figure 3 is a side view of the apparatus of Figure 2.
Figure 4:
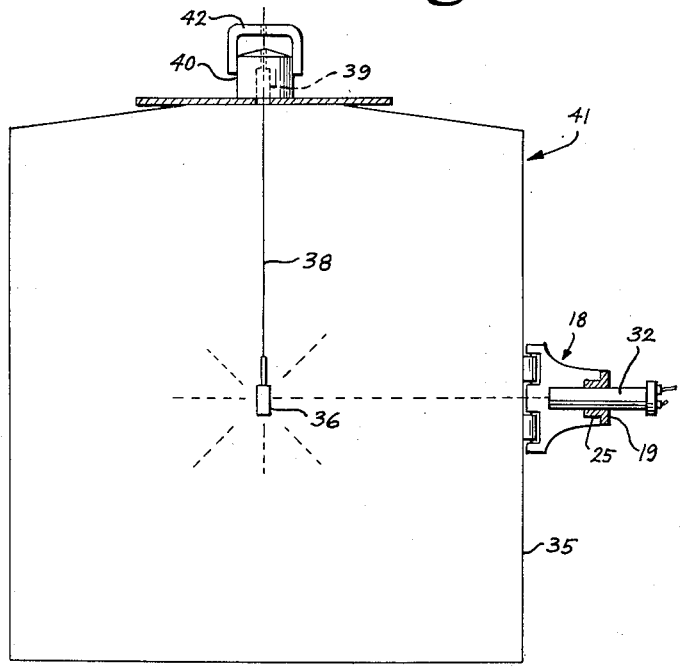
Figure 4 is a view of alternative placement of the apparatus for transmission measurement of a tank wall illustrating the use of the sources in a plumb-bob and the replacement of the detector head in the detector carriage.

The preferred form of apparatus for thickness measurement is illustrated in Figures 2 to 4. The radiation detector apparatus is preferably in the form of a detector carriage 18 comprising the mounting platform 19, from which extend the diverging arms 20 and 21 carrying at their free ends rubber rollers 22, 23 and 24 as shown to provide a three point engagement with the surface of the material to be examined. The platform 19 includes a collar 25, the inner gripping surface of which is adjustable by means of the clamping screw 26 cooperating with the slot 27 in the carriage to provide a constriction of the inner surfaces of the collar about a mounting post 28 of the collimating head unit 29. The collimating head unit is preferably cast from lead or other suitable radiation isolating material to form an isolating body of an interior design corresponding to the requirements set forth in the diagrammatic illustration of Figure 1. As illustrated in Figure 2, a cartridge 30 carrying the source material is insertable in a bore in the collimating head body 31 to position it at the base of the collimating passage. The detector head 32 comprises a cylindrical casing enclosing preferably a photomultiplier class of detector unit and is insertable into a bore in the collimating head preferably of a diameter corresponding to the inside diameter of the collar 25. Accordingly, the radiation source cartridge 30 and the detector head 32 are readily removable from the collimating head and, if desired, and in accordance with the invention, the detector head may be positioned within the collar 25 in place of the mounting post 28 carrying the collimating head 29.

It will be appreciated that when the radiation reflection measuring head illustrated in Figures 2 and 3 is employed, the carriage may be traversed by the operator over the surface of the material the thickness of which is being measured in such manner as to scan the entire surface thereof and to obtain an absolute measurement of the thickness. In this respect, the apparatus and method of the invention is capable of delivering a record of the entire surface of a tank wall and because the collimating head is positioned in spaced relation to the surface of the wall it is possible to move the apparatus in horizontal lines about a tank.

Figure 5:
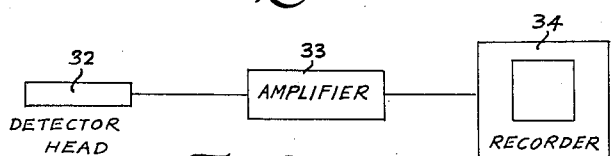
Figure 5 is a diagrammatic view of apparatus associated with a detector head for obtaining a continuous reading of thickness of a material in accordance with the invention.

The components preferred for use with the detector head are shown in Figure 5. The detector head 32 is connected by a suitable cable to an amplifier 33 such as that disclosed in my co-pending application, the latter operating a suitable recording device 34 such as a pen recorder of well known construction adapted to obtain a continuous record of the readings derived from scanning a tank wall.

It will be observed that, as compared with other thickness measuring methods and apparatus, the detector head when positioned for reflection measurement in the manner described is spaced from the surface of the tank wall or material to be measured. Likewise, when the detector head is mounted within the collar of the detector carriage 18 for a transmission method of measurement, illustrated in Figure 4, the detector head is held in spaced apart relation from the surface of the tank wall 35 so that it is possible to avoid the irregularities in the wall and to scan the entire surface thereof.

As illustrated in Figure 4, in the transmission method the source cartridge 36, which may be the same cartridge employed for reflection measurements, is suspended by a cord 38 passing through a chamber 39 of a carrier 40 supported on the axial line of the tank 41. The source cartridge is suspended as a plumb-bob at a level corresponding to the height of the detector head 32 in any particular horizontal scanning position.

The carrier 40 is comprised of a suitable body of isolating material such as lead having a carrying handle 42 and a locking screw (not shown), the latter being adapted to engage the cartridge 36 to retain the same within the bore 39 of the carrier for transporting purposes.

The transmission method of measurement illustrated, that is, where the source is positioned on an opposite side of the material from the detector head, is in general more adaptable to the measurement of very thick materials such as steel of the order of 1½ inches or greater in thickness, and where convenient, is found to be more accurate. However, in those cases where it is not convenient to employ the transmission method, for example, where the source and the detector head must be positioned on one side of the material being examined, the reflection method in conjunction with the scanning method herein disclosed is suitable.

What I claim as my invention is:

1. A method of measuring thickness of a material, comprising: subjecting the material to radiation from a source of radiation energy; mounting a detector adapted to detect the energy, in a position spaced from the surface of the material; scanning the surface of the material with the detector while the latter is maintained in the said predetermined spaced relation; continuously recording the energy received by the detector from the material as the detector traverses thereover in scanning the same; supporting the source in predetermined spaced apart relation from the surface of the material being examined and on the same side thereof as the detector; substantially isolating the detector and the source from one another; and supporting the source and the detector a distance $a$ from the surface of the material the thickness of which is being measured in accordance with the relation $$a = \tfrac{4}{5}d \tan A \text{ approximately}$$

where $d$ is the distance between the source and the detector, and A is the mean angle of incidence of the collimated radiation from the source with respect to the surface of the material being examined.

2. Apparatus for measuring the thickness of a material, comprising in combination: a collimating head formed of a radiation isolating material; a detector head removably mounted in said body; a cartridge containing a source of radiation energy, removably mounted in said body a predetermined distance $d$ from said detector head, and substantially isolated therefrom by said isolating material; a detector head carriage having a platform from which diverge a pair of support arms; three suspension members on the free ends of said arms adapted to provide substantially a three point contact with the surface of a material the thickness of which is to be measured; a post extending from said collimating head to dispose said source and detector a distance $a$ from a surface engaged by said suspension members according to the relation $$a = \tfrac{4}{5}d \tan A \text{ approximately}$$

where A is the mean angle of incidence of collimated radiation from said head to a surface engaged by said suspension members.

3. Apparatus for measuring the thickness of a material, comprising in combination: a collimating head formed of a radiation isolating material; a detector head removably mounted in said body and having a casing of predetermined width; a cartridge containing a source of radiation energy, removably mounted in said body a predetermined distance $d$ from said detector head, and substantially isolated therefrom by said isolating material; a detector head carriage having a platform from which diverge a pair of support arms; three suspension members on the free ends of said arms adapted to provide substantially a three point contact with the surface of a material the thickness of which is to be measured; a post of substantially the same width as said casing extending from said collimating head, means in said platform for removably mounting said casing and alternatively for mounting said post to dispose said source and detector while in said head a distance $a$ from the surface of the material to be measured when engaged by said suspension means in accordance with the relation $$a = \tfrac{4}{5}d \tan A \text{ approximately}$$

where A is the mean angle of incidence of collimated radiation from said head to a surface engaged by said suspension members.

References Cited in the file of this patent

UNITED STATES PATENTS

| Number | Name | Date |
|---|---|---|
| 2,277,756 | Hare | Mar. 31, 1942 |
| 2,304,910 | Hare | Dec. 15, 1942 |
| 2,315,819 | Schlesman | Apr. 6, 1943 |